United States Patent [19]

Schierling et al.

[11] Patent Number: 5,321,878

[45] Date of Patent: Jun. 21, 1994

[54] METHOD FOR REMOVING A MOTOR VEHICLE FRICTION CLUTCH

[75] Inventors: Bernhard Schierling, Kürnach; Georg Kraus, Bergrheinfeld, both of Fed. Rep. of Germany

[73] Assignee: Fichtel & Sachs AG, Schweinfurt, Fed. Rep. of Germany

[21] Appl. No.: 7,848

[22] Filed: Jan. 22, 1993

[30] Foreign Application Priority Data

Jan. 21, 1992 [DE] Fed. Rep. of Germany ....... 4201417

[51] Int. Cl.$^5$ .................. B23P 19/00; F16D 13/00
[52] U.S. Cl. ................. 29/426.5; 29/402.08; 29/426.6; 192/70.13; 192/70.27
[58] Field of Search ............ 29/402.03, 402.08, 426.5, 29/426.6; 192/70.13, 70.27, 89 PH

[56] References Cited

U.S. PATENT DOCUMENTS

| | | | |
|---|---|---|---|
| 4,502,198 | 3/1985 | Billet | 29/402.08 |
| 4,600,092 | 7/1986 | Billet et al. | 192/70.11 |
| 4,648,499 | 3/1987 | Despres et al. | 29/426.5 X |
| 4,811,826 | 3/1989 | Kittel et al. | 192/70.27 X |
| 5,078,247 | 1/1992 | Meyer | 192/89 PH X |
| 5,143,190 | 9/1992 | Westendorf et al. | 192/70.27 |
| 5,191,810 | 3/1993 | Craft et al. | 192/70.13 X |

FOREIGN PATENT DOCUMENTS

| | | |
|---|---|---|
| 0270980 | 5/1990 | European Pat. Off. . |
| 3838307 | 5/1990 | Fed. Rep. of Germany ... 192/70.13 |
| 4014470 | 11/1991 | Fed. Rep. of Germany . |
| 2244541 | 12/1991 | United Kingdom . |
| 2244542 | 12/1991 | United Kingdom . |
| 2244543 | 12/1991 | United Kingdom . |

*Primary Examiner*—Mark Rosenbaum
*Assistant Examiner*—S. Thomas Hughes
*Attorney, Agent, or Firm*—Brumbaugh, Graves, Donohue & Raymond

[57] ABSTRACT

The invention relates to a method for removing a motor vehicle friction clutch of modular design and to friction clutches suitable for this method. The arrangement of openings in the clutch plate and the use of specific tools for venting the friction clutch enable the clutch plate to be orientated such that the fastening screws may be opened by corresponding screwdrivers through the slots of the spring tongues of the diaphragm spring and through the openings in the clutch plate. This enables a clutch module to be exchanged completely after damage or normal wear.

22 Claims, 11 Drawing Sheets

METHOD FOR REMOVING A MOTOR VEHICLE FRICTION CLUTCH

BACKGROUND OF THE INVENTION

The invention relates to a method for removing a motor vehicle friction clutch of modular design and to a friction clutch according to the process.

Known friction clutch modules comprise a pressure plate unit having a clutch casing, a diaphragm spring arranged therein, a pressing plate which is arranged non-rotatably but axially movably relative to the clutch casing and an axially prestressed diaphragm spring. The pressure plate unit is non-detachably fastened with interposition of a clutch plate to a centrifugal mass. The diaphragm spring loads the pressing plate with force in the direction of the centrifugal mass for fixing the friction linings arranged on the clutch plate. The clutch module is fastened by means of a plurality of concentrically arranged screws to the face end of a crankshaft of an internal combustion engine. The screws are inserted through substantially congruent openings in the region of the tongues of the diaphragm spring, in the clutch plate and in the centrifugal mass and are screwed in the crankshaft and rest with their caps on a face of the centrifugal mass.

A dual mass flywheel is known from European patent 0 270 980 in which the hub of the clutch plate is provided with openings to allow the screws for fastening the crankshaft-side mass to be serviced from the exterior. A modular clutch is also known from German Offenlegungsschrift 40 14 470, in which the clutch casing is rigidly connected to the flywheel and removal of the clutch for repair purposes is not possible via the screws connecting the entire clutch module to the crankshaft.

SUMMARY OF THE INVENTION

The present invention provides a method for removing a motor vehicle friction clutch of modular design and further provides a friction clutch which is suitable for this process, with which it may be separated from the crankshaft of the internal combustion engine of a motor vehicle with justifiable expenditure.

According to the invention the removal method involves the following steps:
a) Separation of an internal combustion engine and a gear in order to arrive at the side of the modular clutch remote from the crankshaft;
b) Application of a tool on the clutch module for the direct or indirect movement of the region of the diaphragm spring resting on the pressing plate in the engaged state of the friction clutch into a release or venting position remote from the flywheel and arresting of the pressing plate in this position;
c) Twisting of the clutch plate such that the screws, the openings in the clutch plate and the openings in the diaphragm spring are substantially aligned with one another in the axial direction;
d) Optionally release of the diaphragm spring and re-fixing of the clutch plate in the orientated position;
e) Introduction of tools through the openings in the diaphragm spring and in the clutch plate for release of the screws.

The above-mentioned method steps allow the pressing plate of the modular clutch to be vented so that the slackly arranged clutch plate may be twisted such that the openings arranged therein are aligned with the screws between centrifugal mass and crankshaft. As the diaphragm spring was orientated, during assembly of the clutch module, such that at least one respective slot between two peripherally adjacent spring tongues was arranged in alignment with a corresponding screw between flywheel and crankshaft and as this position of the diaphragm spring is maintained in all operating states, it is possible to reach the screws in the crankshaft from the exterior with suitable tools through, for example, slightly enlarged slots. This embodiment allows a modular clutch to be exchanged completely in a simple manner and allows a new one to be installed again in the same manner. Care should merely be taken during reassembly of a modular clutch to orientate the clutch plate such that the openings arranged in it for guidance of the tool are aligned with the corresponding holes in the flywheel and with the corresponding slots in the spring tongues of the diaphragm spring.

In a friction clutch suitable for this process, it is proposed that the tool for venting the pressing plate simultaneously serves for arresting in the vented position. A particularly simple mode of operation is therefore possible during the removal of the modular clutch.

In a preferred embodiment there is provided a screw which extends coaxially with the axis of rotation of the crankshaft, rests on the one hand axially directly or indirectly on the crankshaft and, on the other hand, pretensions the ends of the spring tongues of the diaphragm spring in the release portion. A design of this type is particularly simple to service as only a single tool has to be applied since this single screw simultaneously pretensions all spring tongues.

On the crankshaft or on the flywheel there is rigidly arranged a plate with a central thread into which the single screw may be screwed from the gear side of the modular clutch. The cap of the screw rests directly or via an interposed plate on the ends of the spring tongues and the diaphragm spring may be vented by screwing the screw into the thread in the appropriate manner. The pressing plate is therefore also released and the clutch plate may be orientated—for example by a screwdriver inserted through the slots in the spring tongues of the diaphragm spring.

In a further variation, it is proposed that a square plate be provided the diagonal of which is greater than the free passage formed by the ends of the spring tongues and of which the edge length is smaller than this passage so that this plate can be threaded through the passage and covers a proportion of the spring tongues on the interior of the diaphragm spring. A screw of which the end rests on the crankshaft is introduced into a central thread of the square plate from the gear side and vents the diaphragm spring by tightening. A simple design of this type is applicable in so-called "tensioned" diaphragm spring clutches. With the tensioned design a movement of the ends of the spring tongues has to take place in the direction of the gear in order to release the clutch plate. The square plate used in this case has a plurality of openings which allow access to the clutch plate from the exterior. It is therefore particularly simple to orientate the clutch plate in the vented state such that the openings arranged in it allow the passage of the tool to the screws in the crankshaft.

However, it is also readily possible that the tool acts directly on the diaphragm spring for releasing the modular clutch. On the other hand, it may rest, for example, on the clutch casing. With a so-called "compressed" diaphragm spring clutch, it is proposed that, between a region of the clutch casing, lengthened radially inwardly over the sweep circle or the spacer bolts or similar fastening elements, and the spring tongues of the diaphragm spring there be arranged a plurality of peripherally distributed spreading elements which increase the distance between the spring tongues of the diaphragm spring and the interior of the casing.

In a preferred embodiment, a plurality of holes is arranged in the lengthened region of the clutch casing, into which there are inserted screws which rest on the interior of the clutch casing via corresponding nuts and wherein the screw ends act upon the diaphragm spring tongues. Such a solution is particularly simple as, for example, three or four peripherally distributed common screws with corresponding nuts may be used as a tool. The diaphragm spring may be brought into its releasing position by appropriate tightening of these screws all round.

According to a further particularly simple embodiment, it is proposed that, at several points between the interior of the lengthened region of the clutch casing and the spring tongues of the diaphragm spring, wedges be driven in which are held by self-jamming and hold the spring tongues in the released position until the clutch module is removed. The wedges can then easily be removed again by pressing down the corresponding spring tongues.

A venting device, which is easy to operate, for a so-called compressed friction clutch is designed such that threaded pegs are provided as tools. The threaded pegs are each inserted into one of a plurality of peripherally distributed holes in the clutch casing directly radially outside the external diameter of the diaphragm spring and engage the diaphragm spring through a bent projection inside the casing. Outside the clutch casing each peg is provided with a thread and a nut for venting of the diaphragm spring by tightening of the nuts. Such a design is particularly advantageous if the internal combustion engine remains in the vehicle with the clutch after separation of internal combustion engine and gear. In the present case, the tools are arranged in the region of external diameter of the friction clutch and are therefore easily accessible.

A simple method of removing a modular clutch with common screws is achieved with a tensioned diaphragm spring clutch in that the diaphragm spring is provided with rounded regions in the region of the radially outer ends of at least some of the slots between two respective spring tongues. The pressing plate is provided with recesses in the region of these rounded regions and holes axially corresponding to the rounded regions are arranged in a radially inwardly lengthened region of the clutch casing into which there may be inserted the screws which rest with their cap on the clutch casing and with a nut on the interior of the diaphragm spring for the venting of the diaphragm spring and pressing plate by tightening of the screws. The nuts on the interior of the diaphragm spring may be introduced relatively easily as the passage through the opening cleared by the spring tongues is relatively great in a tensioned diaphragm spring clutch.

In an advantageous design of the tools for removing a modular clutch of both tensioned and compressed design, these tools in the form of peripherally distributed threaded pegs are introduced through holes in a radially inwardly lengthened region of the clutch casing, penetrate the diaphragm spring in slots between two respective spring tongues and, with radially outwardly directed bent projections, engage behind a web of the pressing plate and, in the region projecting from the clutch casing, have a thread with a nut for the venting of the pressing plate. The threaded pegs may be designed to prevent twisting in the region guided through the slots with mutually opposed plane-parallel faces which have slight clearance relative to the corresponding slot. Such a design has the advantage of being applicable both to tensioned and to compressed diaphragm spring clutches.

A further method of carrying out a venting process with both tensioned and compressed diaphragm spring clutches using a very simple tool resides in the fact that a plurality of tools in the form of peripherally distributed screws is guided through holes in the clutch casing and through rounded regions in the diaphragm spring which represent the radially outer boundary of the individual slots of the spring tongues into corresponding threaded holes in the pressing plate in order to vent the pressing plate by tightening of the screws which are supported by their cap on the exterior of the clutch casing. This arrangement is particularly simple to operate as the peripheral allocation of casing, diaphragm spring and pressing plate is guaranteed at any time and the screwing in of common screws is not accompanied by any problems.

A further simple method of venting a compressed or tensioned diaphragm spring clutch resides in the fact that a tool in the form of a simple lever may be introduced in succession through openings peripherally distributed at several points in the clutch casing, wherein the openings are arranged in the region radially outside the pressing plate and corresponding openings are provided in the pressing plate radially in alignment with the openings in the clutch casing. The lever penetrates with its end into the corresponding openings so that the pressing plate performs a release movement due to pivoting of the part of the tool extending outside the clutch casing in the direction of the centrifugal mass. In the region of the inserted lever, two further holes radially aligned in the released state of the clutch are provided in a peripherally offset manner in the clutch casing and in the pressing plate into which a respective arresting pin is inserted from the exterior. This method of venting a diaphragm spring clutch is suitable for both compressed and tensioned clutches and may be carried out simply from radially outside. With this embodiment, a separating method between internal combustion engine and gear would not be necessary.

The method for removing a motor vehicle friction clutch of modular design and the means for carrying out this process may advantageously be used, in particular, in dual mass flywheels. It is also possible, owing to a modular clutch, to use a compact, pre-assembled unit which merely has to be screwed on the crankshaft. Despite the modular design, it is possible to exchange the entire module at any time without a complex dismantling process.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
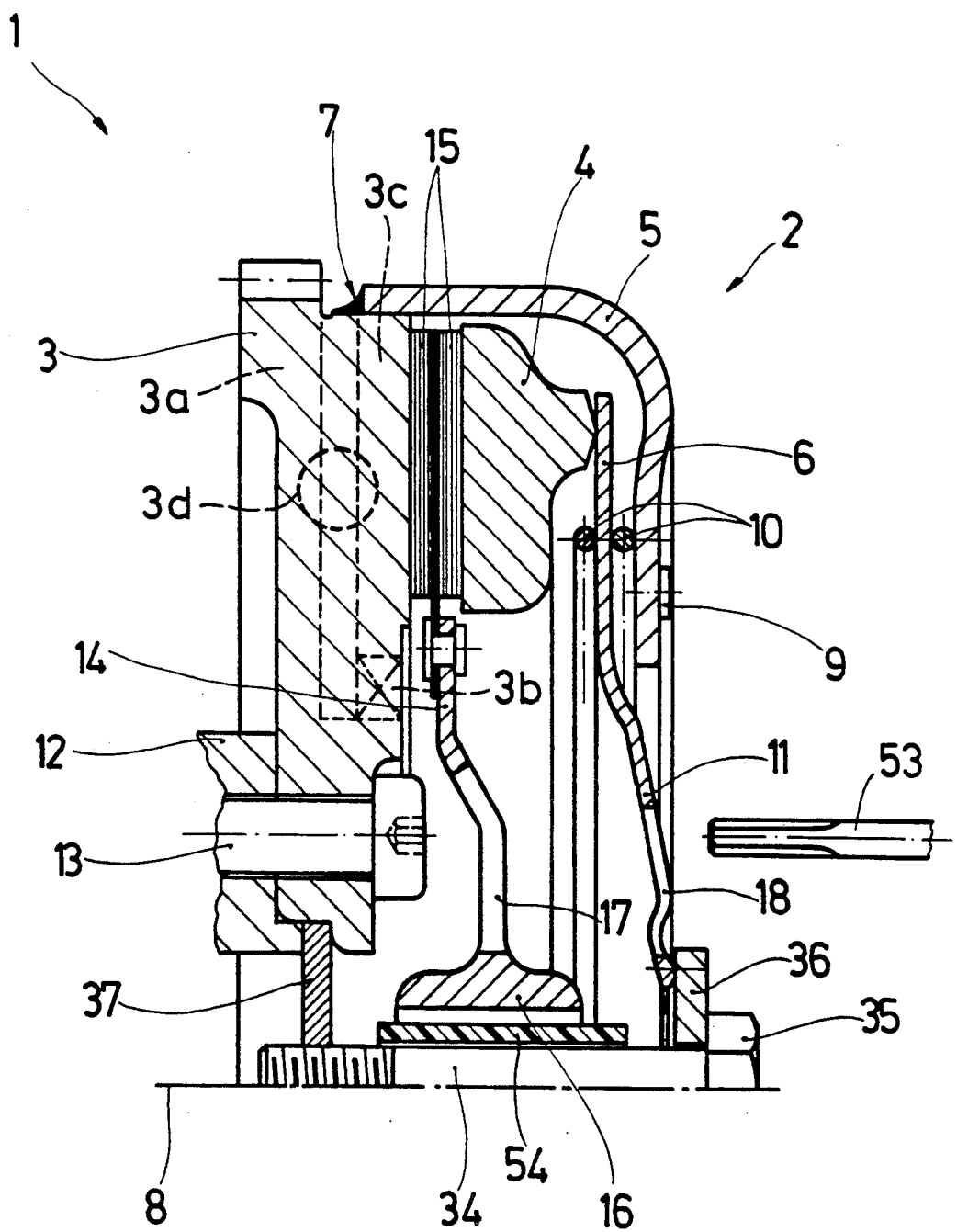
FIG. 1 is the upper half of a longitudinal section through a friction clutch of modular design with a centrally arranged tool.
Figure 2:
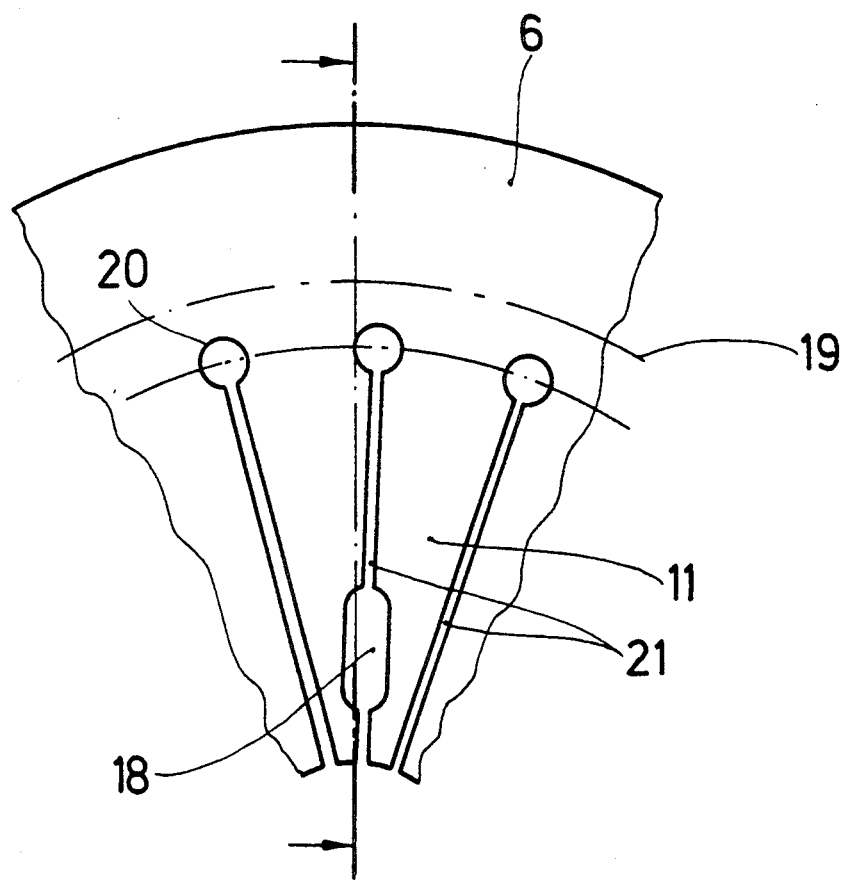
FIG. 2 is a partial view of the diaphragm spring according to FIG. 1.

FIG. 1 and 2 show a friction clutch 1 of modular design which is designed as a so-called compressed diaphragm spring clutch. Hereinafter, the term modular design means that a clutch casing 5 is non-detachably rigidly connected to a flywheel 3 during assembly of the friction clutch 1. Therefore, a pre-assembled constructional unit is supplied by the clutch manufacturer, the unit merely having to be screwed onto a crankshaft 12 of the internal combustion engine. The clutch module according to FIG. 1 has a diaphragm spring 6 which is pivotally mounted on the clutch casing 5 over a central diameter (sweep circle 19 according to FIG. 2). This sweep circle 19 is portrayed, for example, by two wire rings 10 which extend concentrically to a common axis of rotation 8 and are held by a plurality of spacer bolts 9 distributed over the periphery. The spacer bolts 9 are riveted in the clutch casing 5 and penetrate rounded regions 20 in the diaphragm spring 6, these rounded regions 20 forming the respective radially outer end regions of slots 21 peripherally separating adjacent spring tongues 11 of the diaphragm spring 6 from one another. The diaphragm spring 6 rests on a pressing plate 4 in the region of its outer periphery and loads the pressing plate in the direction of the flywheel 3 with interposition of friction linings 15 of a clutch plate 14. In order to actuate the friction clutch 1, the radially internal ends of the spring tongues 11 are pivoted axially toward the crankshaft 12 so that the diaphragm spring 6 tilts round its sweep circle 19 and, with its region resting on the pressing plate 4, performs a movement directed away from the flywheel 3. The friction linings 15 of the clutch plate 14 are then free from frictional engagement. In the region between the friction linings 15 and a hub 16 of the clutch plate 14 which, in operation, rests via teeth non-rotatably on a gear shaft, the clutch plate 14 has a plurality of peripherally distributed openings 17. These openings 17 are arranged in number and in size in the clutch plate 14 such that they correspond to screws 13 for connecting the flywheel 3 to the crankshaft 12 in the axial direction. Similarly, the diaphragm spring 6 is arranged in the clutch casing 5 such that at least its slots 21 correspond to the openings 17 and the screw orifices for the screws 13 in the flywheel 3. If necessary, widened regions in the form of openings 18 may be provided in addition to the screw orifices for the screws 13 in the slots 21 of the diaphragm spring 6 to enable a tool in the form of a screwdriver 53 to be inserted more easily.

The friction clutch 1 in the form of the clutch module is supplied as a pre-assembled, orientated unit and is screwed on the crankshaft 12 in that the screws slackly inserted in the flywheel 3 are tightened by the screwdriver 53, the screwdriver 53 being introduced through the openings 18 in the diaphragm spring 6, through the openings 17 in the clutch plate 14 into the screws 13. A condition for this is that a pressure plate unit 2 of the friction clutch is orientated relative to the flywheel 3 during assembly such that the openings 18 in the spring tongues 11 are orientated with the screw orifices for the screws 13 and such that the clutch plate 14 is also correspondingly orientated with its openings 17.

Once the friction clutch 1 is worn out, it may be exchanged in its entirety. For this purpose, the internal combustion engine and the gear have to be separated from one another. It is basically unimportant whether the gear is removed or the internal combustion engine with the friction clutch. A clamping tool is then applied in order to release the clutch. This procedure is necessary as the clutch plate 14 does not maintain its allocation with its openings 17 relative to the screws 13 during operation. In the released state of the friction clutch 1 it is possible to orientate the clutch plate 14, for example by a screwdriver introduced into the slots 21, such that the openings 17 correspond to the screws 13. For this purpose, a plate 37 is inserted between flywheel 3 and crankshaft 12 into which a screw 34 is inserted with its thread. The screw 34 extends in the axis of rotation 8 of the friction clutch 1. By screwing in the screw 34 it is possible to pretension the radially internal ends of the spring tongues 11 in the direction of the crankshaft either directly through the cap 5 or with interposition of a plate 36. This procedure corresponds to the release process of the friction clutch 1. The clutch plate 14 thus becomes peripherally free with its friction linings 15 and may be orientated. The screw 34 is removed after orientation so that the clutch plate is again fixed over the pressing plate 4 in this position by friction. The screwdriver 53 may then be introduced through the openings 18 and 17 in order to release the screws 13. The entire clutch module may then be removed. During work with the screw 34, the screw may be provided with a bush 54 in order, on the one hand, to support the teeth of the hub 16 and, on the other hand, to guarantee a central position of the clutch plate 14 relative to the axis of rotation 8 even during the removal process.

Figure 3:
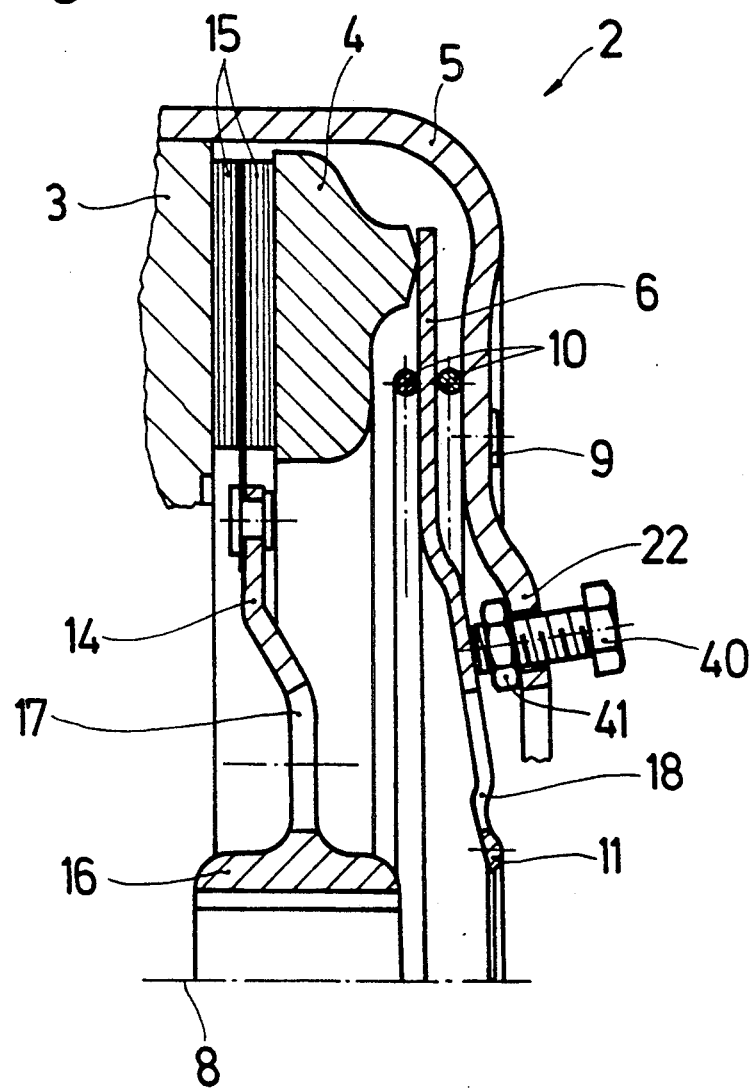
FIG. 3 is a partial longitudinal section through a compressed friction clutch with an arrangement of screws between casing and spring tongues.

FIG. 3 shows a pressure plate unit 2 in which, for removal of the clutch module, the clutch casing 5 has a radially internal lengthened region 22 in which a plurality of peripherally distributed holes is provided for insertion of conventional commercial screws 40. The introduction of nuts 41 behind the screws 40 enables the central regions of individual spring tongues 11 of the diaphragm spring 6 to be loaded in succession by tightening the screws 40 so that a venting movement of the diaphragm spring 6 may be achieved. It is thus possible to free the clutch plate 14 from frictional engagement and to orientate it such that its openings 17 correspond to the openings 18 in the spring tongues 11. It is then immediately possible to remove the clutch module by releasing the screws 13 according to FIG. 11, but it is also possible firstly to release and remove the screws 40 and to remove the clutch module with orientated but fixed clutch plate 14. The holes may be provided with a direct thread instead of the nuts 41.

Figure 4:
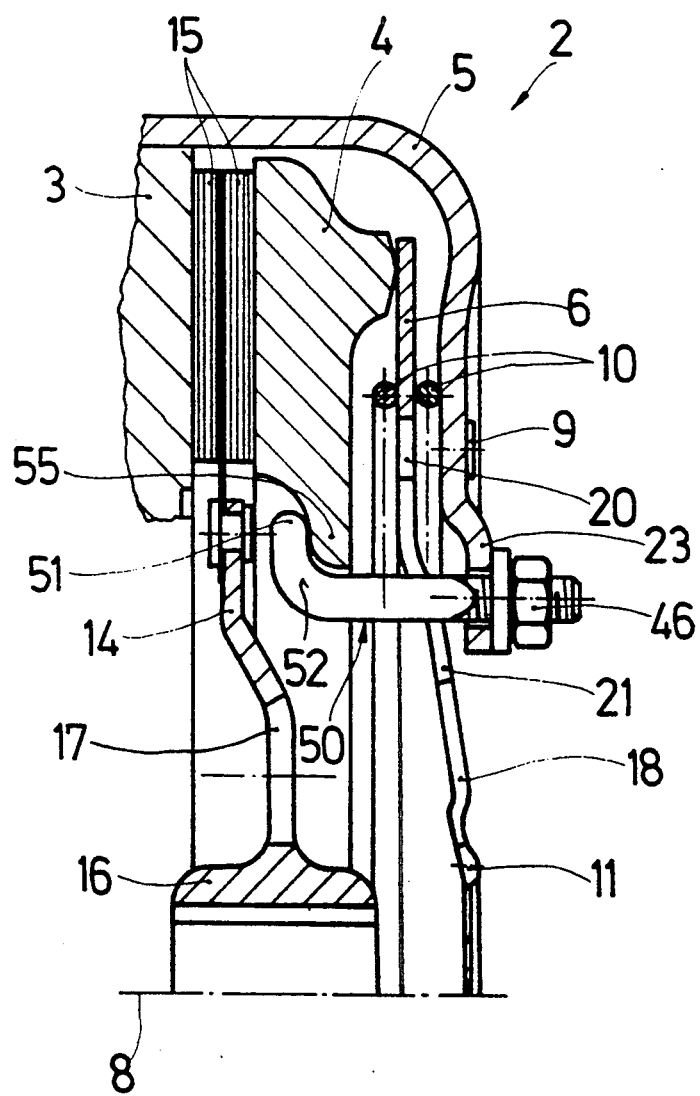
FIG. 4 is a partial longitudinal section through a friction clutch with a tool engaging behind the pressing plate.

The variation shown in FIG. 4 is independent of whether the pressure plate unit 2 is designed as a compressed or a tensioned friction clutch. In the present case, it is illustrated as a compressed friction clutch. The clutch casing 5 is also provided with a radially internal lengthened region 23 and a plurality of peripherally distributed holes is provided in this region. These holes are arranged to correspond to the slots 21 between the individual spring tongues 11 of the diaphragm spring 6. In the present case, a plurality of peripherally distributed venting tools in the form of threaded pegs 50 is provided which are provided with a thread at one end for receiving a nut 46 and have a bent projection 51 at the other respective end which engages radially from the interior behind a web 55 of the pressing plate 4. By tightening the nut 46 it is possible to bring the pressing plate 4 into the released position so that the clutch plate 14 may be orientated. For simplification, each threaded peg 50 may be provided with two plane-parallel faces 52 which extend parallel to the slots 21 in the diaphragm spring 6 and which prevent rotation of the threaded pegs 50. After the orientation of the clutch plate 14, the clutch module may be removed directly or is removed after removing the threaded peg 15 and re-fixing the clutch plate 14 in the orientated position.

Figure 5:
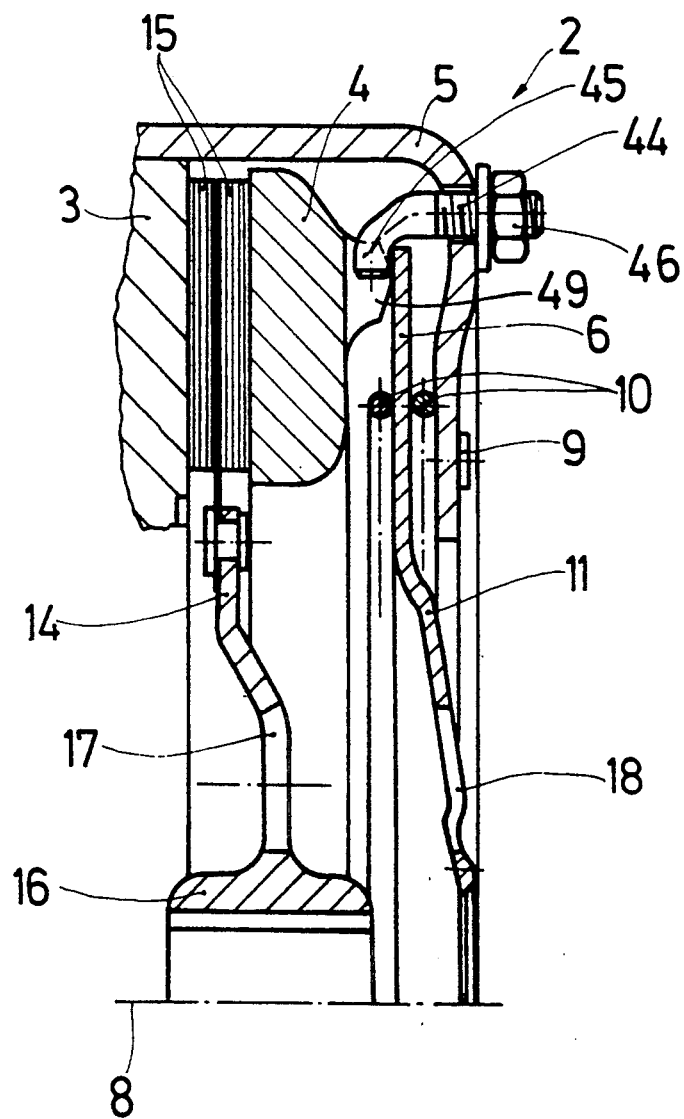
FIG. 5 is a partial longitudinal section through a friction clutch with the diaphragm spring on the tool engaging behind the external periphery.

The variation according to FIG. 5 may only be used with a compressed friction clutch but is otherwise closely related to FIG. 4 with respect to the design of the tools. In this case, the threaded pegs 44 are inserted into appropriately peripherally distributed holes in the casing 5, these holes being provided slightly radially outside the external diameter of the diaphragm spring 6 and the threaded pegs 44 each having a bent projection 45 capable of engaging behind the external diameter of the respective diaphragm spring 6. For this purpose, the pressing plate 4 has corresponding recesses 49 peripherally at the points at which the openings in the clutch casing 5 are arranged. By the arrangement of nuts 46 and tightening of the nuts 46 it is possible to bring the diaphragm spring 6 into its relaxed state so that the pressing plate 4 and the clutch plate 14 with the friction linings 15 is free from frictional fixing and may be orientated such that the openings 17 are aligned with the screws 13 in the crankshaft. The clutch module may also be removed in the released state of the pressure plate unit 2 or in the re-engaged state.

Figure 6:
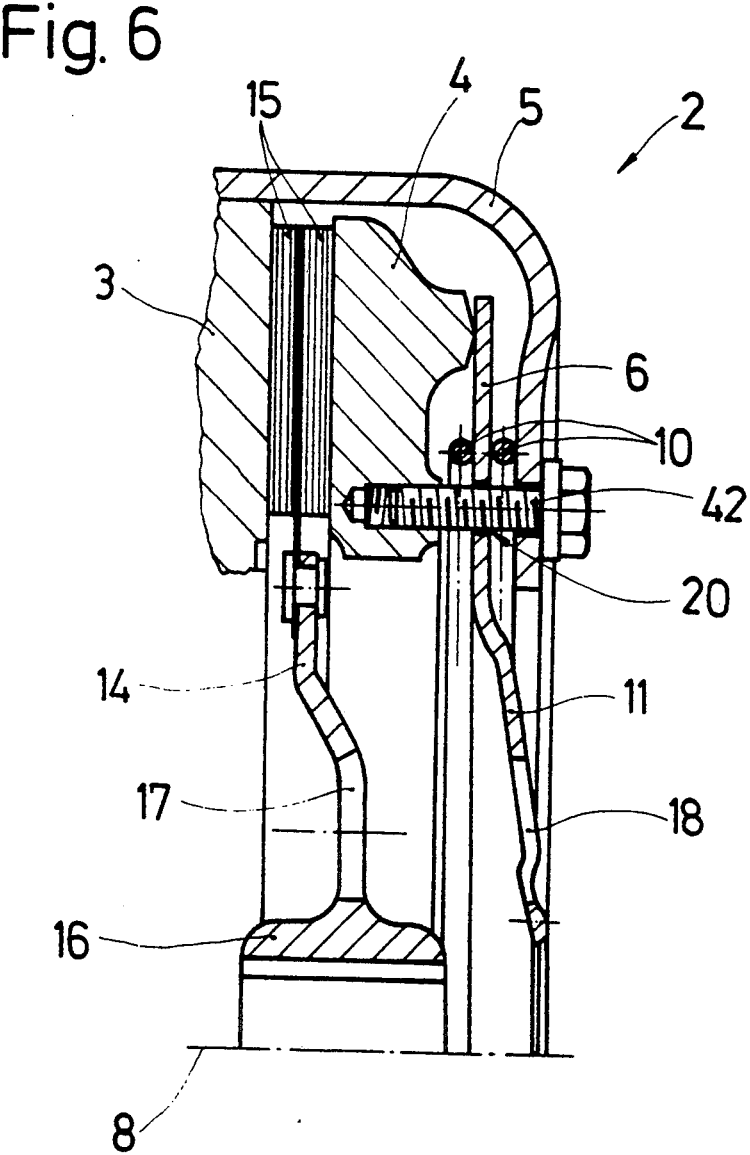
FIG. 6 is a partial longitudinal section through a friction clutch with screws which may be screwed through the casing directly into the pressing plate.

The embodiment according to FIG. 6 shows a pressure plate unit 2 of the so-called compressed design. In this case, however, it is also possible to provide a tensioned design. In the clutch casing 5 of the pressure plate unit 2, a plurality of peripherally distributed holes is provided for introduction of conventional commercial screws 42. In a compressed diaphragm spring clutch, these holes are peripherally offset from the spacer bolts 9 according to FIG. 1. The screws 42 penetrate the diaphragm spring 6 in rounded regions 20 which, in FIG. 2, represent the radially outer boundary of the individual slots 21 of the spring tongues 11. Corresponding threads in the pressing plate 4 are aligned with the holes in the casing 5 and the rounded regions 20 in the diaphragm spring 6 so that the pressing plate 4 may be brought into its vented position with the screws 42. In this position the clutch module may be removed after orientation of the clutch plate 14. However, it is also possible to remove the module with re-fixed clutch plate 14 after orientation of the clutch plate and after removal of the screws 42.

Figure 7:
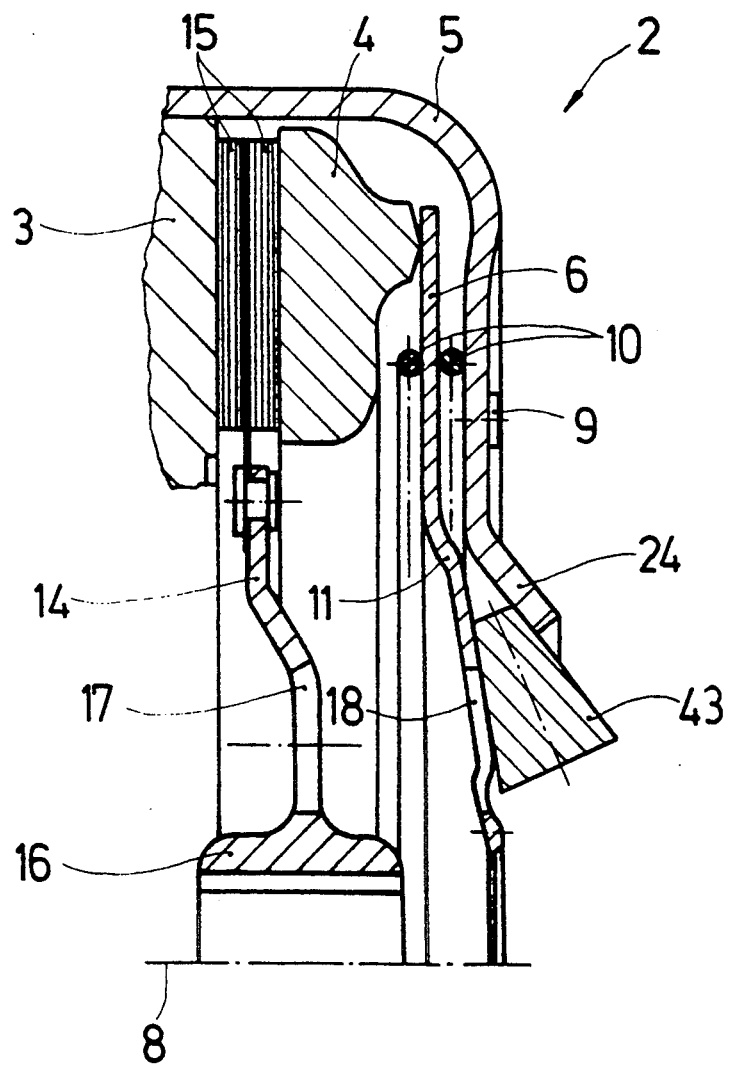
FIG. 7 is a partial longitudinal section through a friction clutch with wedges which may be driven between clutch casing and spring tongues.

FIG. 7 shows the pressure plate unit 2 of a compressed diaphragm spring clutch in which wedges 43 may be driven between a radially inwardly lengthened region 24 of the clutch casing 5 and individual spring tongues 11 in order to vent the pressing plate 4. These wedges pretension a plurality of peripherally distributed spring tongues 11 such that the diaphragm spring 6 pivots into its venting position. The faces between the lengthened region 24 of the clutch casing 5 and the spring tongues 11 on the one hand and the corresponding faces of the wedges 43 on the other hand are dimensioned such that, in the released state, the wedges 43 are held by self-jamming between the clutch casing and the spring tongues so that the clutch plate 14 can be correspondingly orientated. The wedges 43 may then be removed by relaxing the respective corresponding spring tongues 11. It is therefore possible to remove the modular clutch.

Figure 8:
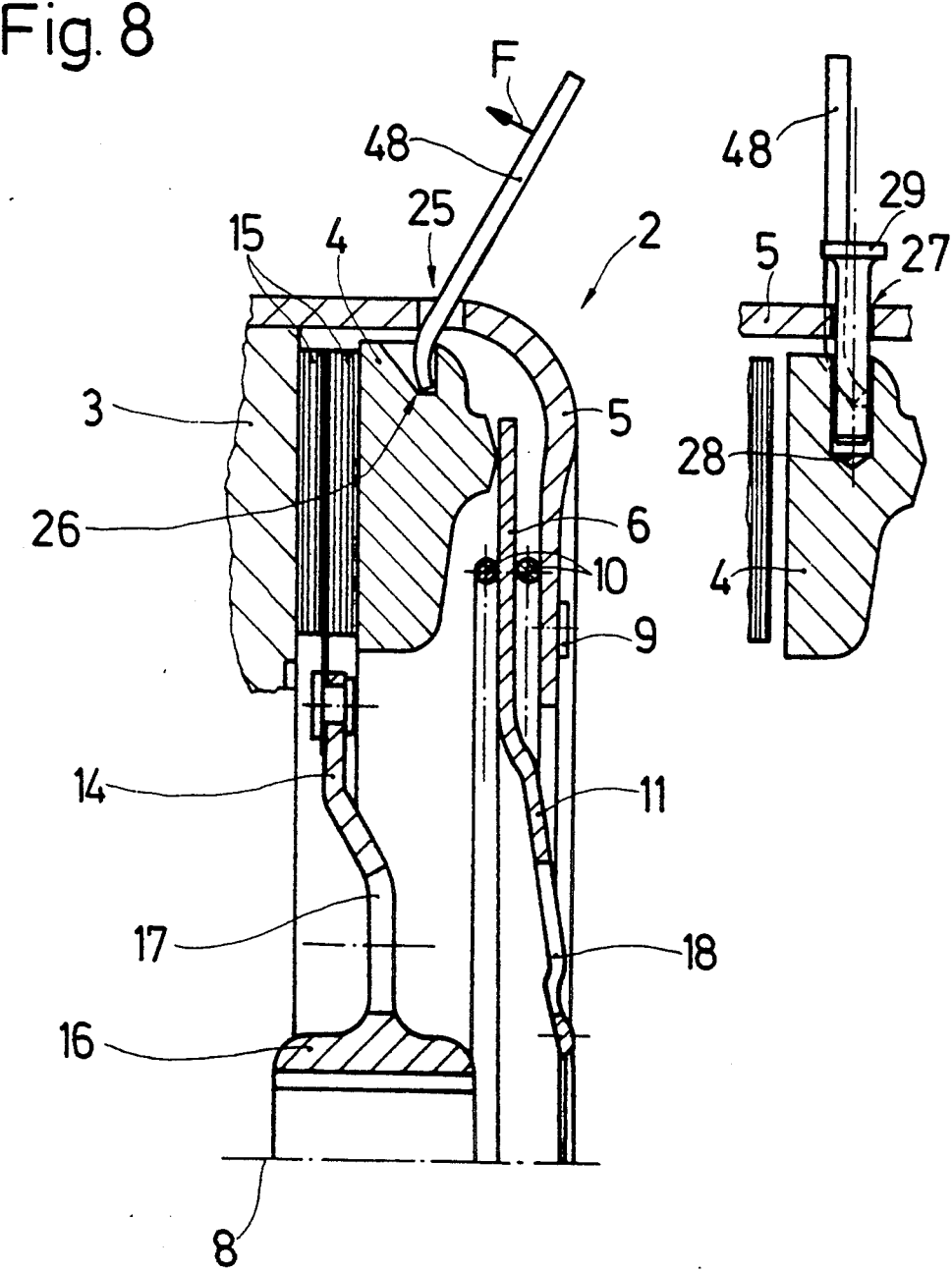
FIG. 8 is a partial longitudinal section through a fraction clutch in which a tool engages from the exterior into the pressing plate and the pressing plate may be fixed relative to the casing.

FIG. 8 shows a pressure plate unit 2 of compressed design in which removal may also be carried out on a tensioned diaphragm spring clutch. In the radially outer region of the clutch casing 5 there is provided a plurality of peripherally distributed openings 25 which correspond at least peripherally to openings 26 in the pressing plate 4. Introduction of a lever 48 by one end through an opening 25 in the clutch casing 5 into an opening 26 in the pressing plate 4 enables the pressing plate 4 to be brought into its venting position—at least over a proportion of its periphery—by pivoting of the part of the lever 48 located outside the clutch casing 5 toward the flywheel 3 (arrow F). In order to fix the pressing plate 4 in this position, radially extending holes 27 and 28 which are aligned in the released position of the pressing plate 4 and into which a respective arresting pin 29 may be introduced radially from the exterior are also arranged peripherally in the region of the openings 25 and 26 in both clutch casing 5 and pressing plate 4. After introduction of the first arresting pin 29, the lever 48 may be introduced at the next peripheral position by rotation of the clutch module so as to bring the pressing plate 4 into the vented position there and to arrest it. The arresting pins are then arranged at two or three peripherally distributed points so that the pressing plate in its entirety is held in its vented position and the clutch plate 14 may be corresponding orientated. It is now possible to remove the clutch module in the vented position or also in the unvented position.

Figure 9:
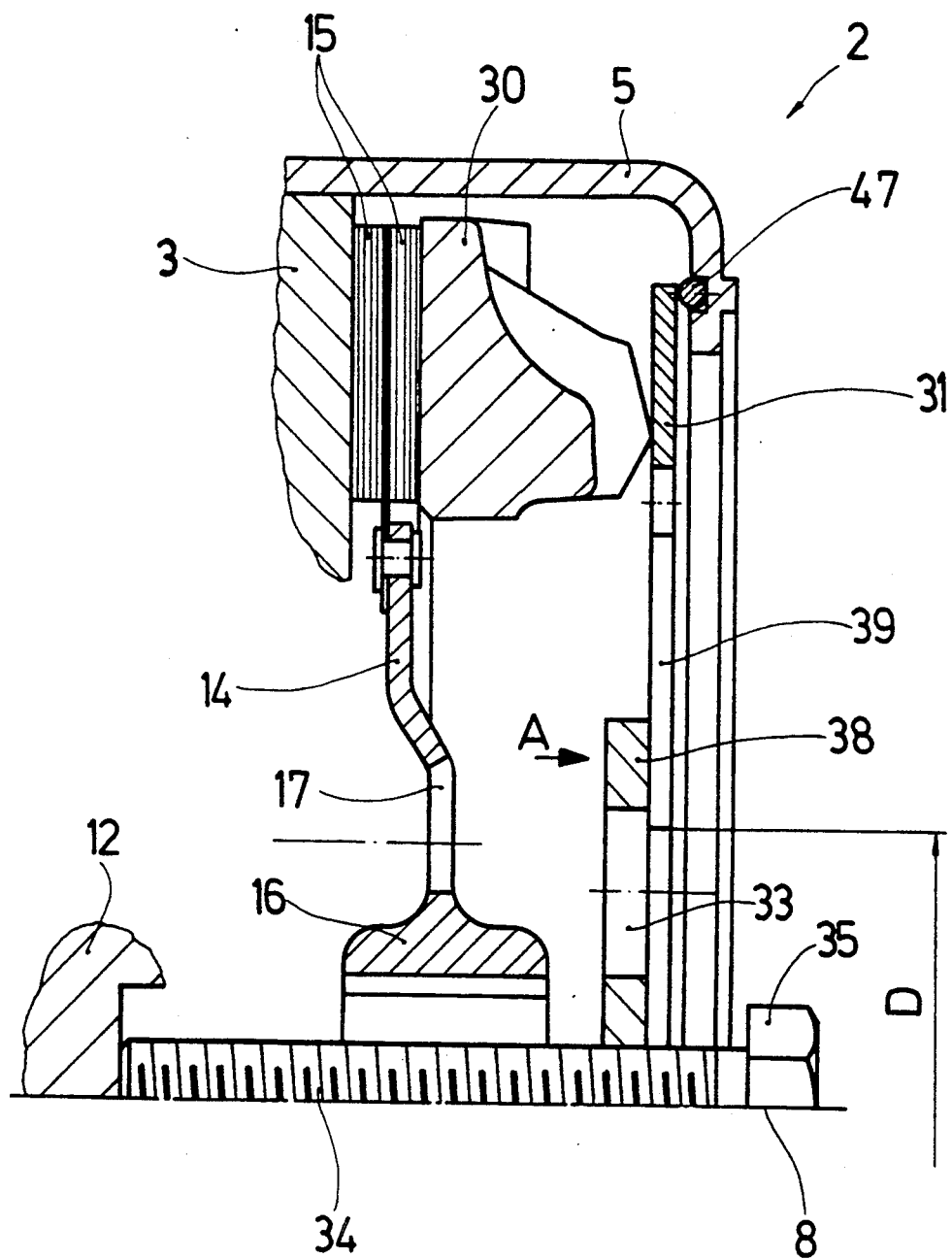
FIG. 9 and 10 are a partial longitudinal section and partial elevation of a tensioned friction clutch with arrangement of a central tool in the form of a screw and a square plate threaded behind the diaphragm spring.
Figure 10:
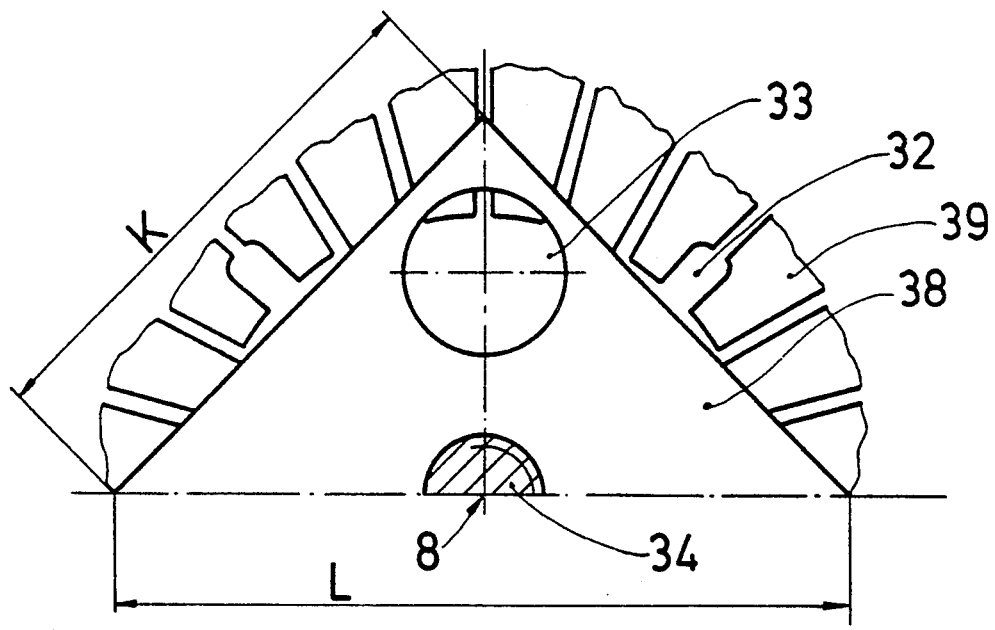

FIGS. 9 and 10 show a partial longitudinal section through a pressure plate unit 2 and a partial elevation "A" in the region of the ends of the spring tongues of the diaphragm spring. The present pressure plate unit 2 is designed as a so-called tensioned diaphragm spring clutch. As normal with tensioned diaphragm springs, the diaphragm spring 31 rests on the clutch casing 5 in the region of its outer periphery, for example via a wire ring 47 arranged peripherally in the clutch casing in the present case. Over a smaller diameter, the clutch rests with internal tension on the pressing plate 30 and loads it in the direction of the flywheel 3 with frictional fixing of the clutch plate 14 with its friction linings 15. In order to release the frictional fixing of the clutch plate 14, a screw 34 arranged centrally with respect to the axis of rotation 8 is provided in the present case, the screw 34 resting axially on the crankshaft 12 or on a component rigidly connected to the crankshaft. The other support for the screw 34 is formed by a plate 38 with a central thread for the screw 34, the plate 38 having a square shape and the diagonal L being greater than the passage D which is formed by the radially inner end regions of the spring tongues 39 of the diaphragm spring 31 and of which the edge length K is somewhat smaller than this passage D. Owing to this dimensioning of the plate 38 it is possible to introduce the plate before application of the screw 34 through the opening corresponding to the passage D in the diaphragm spring 31 and to place the plate on the back of the spring tongues 39. The screw 34 is then introduced and screwed by the thread in the plate 38 until the end of the screw 34 comes to rest on the crankshaft 12. It is then possible, by tightening of the screw 34 by means of its cap 35, to move the plate 38 away from the crankshaft 12 so that the diaphragm spring 31 is brought into the venting position via its spring tongues 39. A plurality of peripherally distributed openings 33 is provided in the plate 38 to simplify the orientation of the clutch plate 14 with its openings 17. After orientation of the clutch plate 14, the screw 34 is turned back and the diaphragm spring 31 then relaxed again and the clutch plate 14 fixed in the orientated position. After removal of the screw 34 and of the plate 38, the clutch module may be removed. The tool for unscrewing the screw 13 can generally be applied within the passage D as this opening is kept greater in tensioned diaphragm spring clutches than in compressed ones. However, if there is insufficient room, it is also possible to intervene through the slots provided peripherally between the individual spring tongues 39.

Figure 11:
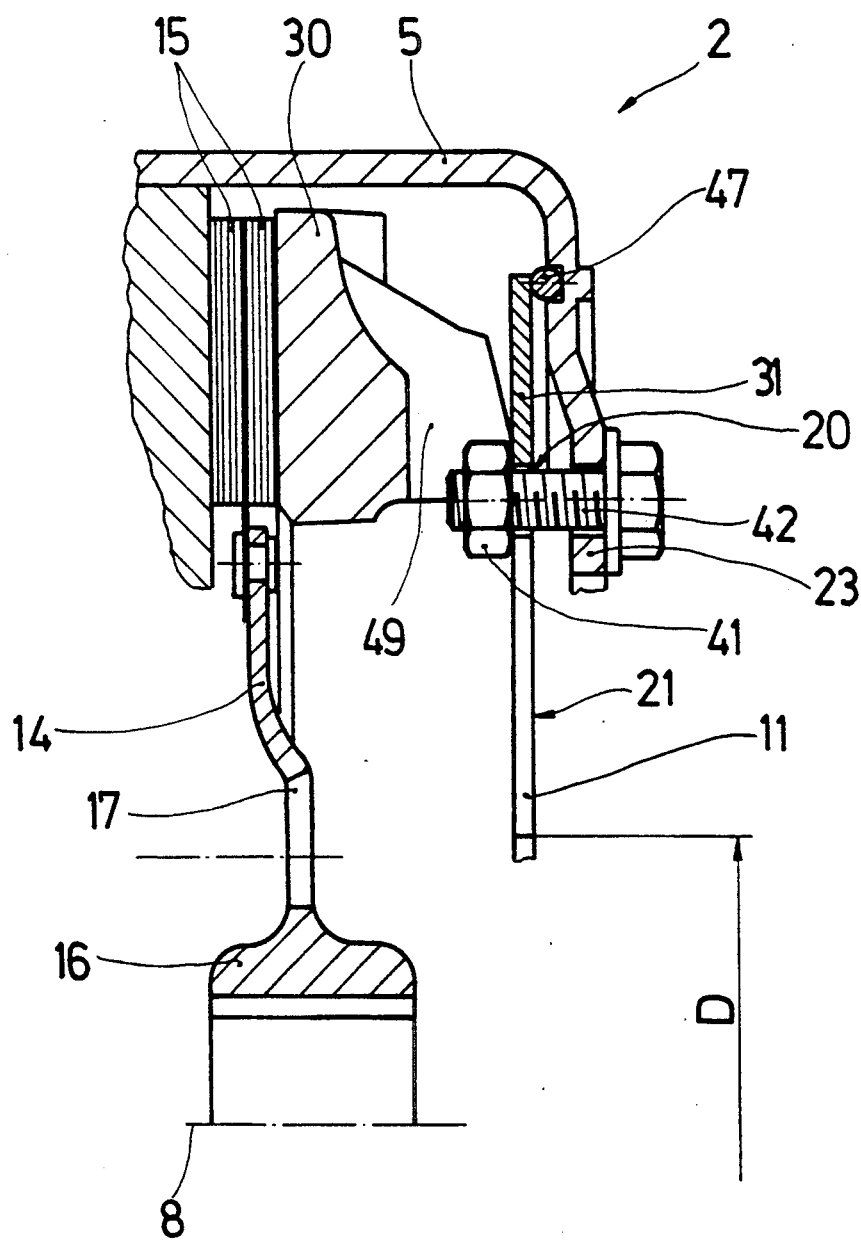
FIG. 11 is a partial longitudinal section through a tensioned friction clutch with individual screws which pretension the diaphragm spring toward the casing.

FIG. 11 shows a further variation of a pressure plate unit 2 of tensioned design in which the venting position of the diaphragm spring 31 is possible owing to a plurality of peripherally distributed conventional commercial screws 42 which release the diaphragm spring 31 together with a nut 41. For this purpose the clutch casing 5 is provided with a radially inwardly lengthened region 23 which extends at least into the region of the diaphragm spring in which the rounded regions 20 of the slots 21 in the foot region of the spring tongues 11 are arranged. A plurality of peripherally distributed openings are provided in the clutch casing 5 here to enable the screws 42 to be introduced. Appropriate recesses 49 are provided in the pressing plate 30 at the points where the screws 42 may be introduced, to enable the respective nuts 41 to be inserted. By tightening of the screws 42 in succession in the peripheral direction it is possible to bring the diaphragm spring 31 into its venting position so that the clutch plate 14 with its friction linings 15 is freed from its frictional fixing. It is thus possible to orientate the clutch plate 14 with its openings 17 to enable the screws 13 in the crankshaft 12 to be opened by a corresponding tool. It is unimportant in the present case whether or not the screws 42 and the nuts 41 are removed prior to removal of the clutch module.

In all designs according to FIGS. 1 to 11 it is assumed that the pressing plate is fastened non-rotatably but axially movably relative to the clutch casing. This ensures the peripheral position of both the pressing plate and the diaphragm spring relative to the clutch casing in any situation. During assembly of the clutch module, the peripheral allocation of diaphragm spring and flywheel is designed such that the slots between the individual spring tongues and the corresponding openings for enlargement of these slots are aligned with the screws for fastening the module on the crankshaft. It is thus possible to guarantee access to the screws from the exterior by orientation of the clutch plate in the position in which it is not fixed by friction.

The pressure plate units described hereinbefore are preferably non-detachably combined with a centrifugal mass 3 designed as a dual mass flywheel to form a clutch module. As indicated in FIG. 1, a dual mass flywheel of this type comprises a primary mass 3a screwed on the crankshaft 12 via the screws 13 and on which a secondary mass 3c is rotatably mounted equi-axially to the axis of rotation by means of a bearing 3b. Springs 3d of a torsional vibration damper couple the masses 3a and 3c torsionally elastically to one another. In this case, the clutch casing 5 is non-detachably rigidly connected to the secondary mass 3c on which the clutch plate 14 also rests with its friction linings 15.

While specific embodiments of the invention have been shown and described in detail to illustrate the application of the inventive principles, it will be understood that the invention may be embodied otherwise without departing from such principles.

What we claim is:

1. A method for removing a friction clutch of modular design which is arranged in the driving train of a motor vehicle between an internal combustion engine and a gear thereof and which is detachably fastened on a face end of a crankshaft (12) of the internal combustion engine by means of a plurality of cap screws (13) extending axially parallel to an axis of rotation (8) of the crankshaft (12), said clutch comprising a centrifugal mass (3) fastened on the crankshaft (12) by means of the cap screws (13), a clutch casing (5) non-detachably fastened on the centrifugal mass (3), a pressing plate (4) non-rotatably but axially movably arranged relative to the clutch casing (5), a clutch plate (14) having friction linings (15) arranged axially between the centrifugal mass (3) and the pressing plate (4), and a diaphragm spring (6; 31) arranged axially between the clutch casing (5) and the pressing plate (4) for pretensioning the pressing plate (4) to urge the friction linings (15) axially against the centrifugal mass (3), wherein at least the clutch plate (14) has openings (17) which are axially aligned with caps of the cap screws (13) holding the centrifugal mass (3) and through which the cap screws (13) may be unscrewed from the crankshaft (12), the method comprising the following steps:

a) separating the internal combustion engine and the gear, b) applying a clamping tool (34, 36; 34, 38; 40; 41; 42; 43; 44; 48; 50) between the centrifugal mass (3) or a component (5) rigidly connected thereto, on the one hand, and the pressing plate (4) or the diaphragm spring (6; 31), on the other hand, c) moving the clamping tool in a direction in which a region of the diaphragm spring (6; 31) resting on the pressing plate (4) moves away from the centrifugal mass (3) or the component (5) rigidly connected thereto, and arresting the pressing plate (4) in a venting position releasing the clutch plate (14), d) orienting the clutch plate (14) and the crankshaft (12) relative to one another such that the openings (17) of the clutch plate (14) are aligned with the cap screws (13), and e) introducing a screwing tool (53) through the openings (17) in the clutch plate (14) and releasing the cap screws (13) with the screwing tool (53) while the clutch casing (5) remains non-detachably fastened on the centrifugal mass (3).

2. The method according to claim 1 wherein the diaphragm spring (6; 31) includes tongues (11) which radially overlap the cap screws (13) and which has openings (18, 21) axially aligned with the cap screws (13) wherein step e) comprises introducing the screwing tool (53) through the openings (17, 18, 21) in the diaphragm spring (6; 31) and the clutch plate (14).

3. The method according to claim 1, wherein step d) comprises rotating the clutch plate (14) relative to the crankshaft (12) to align the openings (17) of the clutch plate (14) with the cap screws (13).

4. The method according to claim 3, further comprising the step of releasing the clamping tool (34, 36; 34, 38; 40; 41; 42; 44; 48; 50) after aligning of the clutch plate (14) in step d) but before releasing the cap screws (13) in step e) and the clutch plate (14) is again fixed between the centrifugal mass (3) and the pressing plate (4).

5. The method according to claim 3, wherein the clamping tool comprises at least one clamping screw (34; 40; 42; 44; 50) and the moving and arresting actions of step c) are simultaneously effected by moving the at least one clamping screw.

6. The method according to claim 5, wherein the diaphragm spring (6; 31) includes tongues (11) which extend radially inwardly towards the axis of the crankshaft (12) and the at least one clamping screw comprises a clamping screw (34) which engages, co-axially with the axis of rotation (8) of the crankshaft (12), the crankshaft (12) or a component (37) rigidly connected thereto, on the one hand, and radially inner ends of the spring tongues (11) of the diaphragm spring (6), on the other hand.

7. The method according to claim 6, wherein the clamping screw (34), for removal of a compressed friction clutch from the side of the diaphragm spring (6), is threadedly received in a central threaded hole in one of a plate (37) rigidly connected to the crankshaft (12) and the centrifugal mass (3), means carried by the clamping screw (34) for engaging the ends of the spring tongues (11) on the side thereof remote from the centrifugal mass (3).

8. The method according to claim 6, wherein, for the removal of a tensioned friction clutch, a non-circular plate (38), of which the largest cross-sectional dimension (L) is greater than the cross-sectional size of a passage (D) formed by the radially inner ends of the spring tongues (11) and of which the smallest cross-sectional dimension (K) is smaller than the cross-sectional size of the passage (D) and is inserted through the passage (D) and is placed against the side, facing the centrifugal mass (3), of the ends of at least a portion of the spring tongues (11), and wherein the clamping screw (34) is screwed from the side remote from the centrifugal mass (3) into a central threaded hole in the plate (38) and abuts the crankshaft (12).

9. The method according to claim 8, wherein the plate (38) has at least one opening (33) and step d) comprises gaining access to the clutch plate (14) from the exterior through the at least one plate opening (33) for purposes of aligning the openings in the clutch plate (14) with the cap screws.

10. The method according to claim 5, wherein, for the removal of a friction clutch in which the clutch casing (5) has a radially inwardly extending region which overlaps radially inwardly extending spring tongues (11) of the diaphragm spring (6) and which is provided with a plurality of holes axially opposing openings (20; 21) in the diaphragm spring (6), the clamping movement of step c) is effected by moving clamping screws (42; 50) which are inserted through the openings (20; 21) in the diaphragm spring (6) and are secured to the pressing plate (4).

11. The method according to claim 10, wherein the clamping screws (42) are screwed into threaded holes in the pressing plate (4) and rest with their caps on the clutch casing (5).

12. The method according to claim 10, wherein the clamping screws comprise threaded pegs (50) which penetrate the diaphragm spring (6) through slots (21) between adjacent spring tongues (11) and which are suspended by a radially outwardly directed bent projections (51) thereon behind a radially inwardly projecting web (55) of the pressing plate (4).

13. The method according to claim 12, wherein each threaded peg (50) has mutually opposed parallel plane faces (52) in the region thereof opposite the slots (21) for rotation prevention.

14. The method according to claim 1, wherein the clamping tool (40; 42; 43; 44) directly engages the diaphragm spring (6; 31).

15. The method according to claim 14, wherein the clamping tool (40, 41; 43; 44) for the clamping tool movement of step c) is supported on the clutch casing (5).

16. The method according to claim 15, wherein for the removal of a compressed friction clutch in which the diaphragm spring (6) is supported at its external diameter on the pressing plate (4) and at a smaller sweep circle diameter (19) on the clutch casing (5), said diaphragm spring (6) having tongues (11) extending radially inwardly of said sweep circle diameter (19), wherein step c) comprises providing a plurality of spreader elements (40; 43) in a peripheral distribution between a region (22; 24) of the clutch casing (5) extending radially inwardly of the sweep circle diameter (19) and the spring tongues (11) of the diaphragm spring (6) for increasing the distance between the spring tongues (11) and the interior of the radially inwardly extending region (22; 24) of the clutch casing (5).

17. The method according to claim 16, wherein the spreader elements (40; 43) of step c) include a plurality of screws 40 received in a plurality of holes in the radially inwardly extending region (22) of the clutch casing (5) with their ends bearing on the spring tongues (11).

18. The method according to claim 17, wherein the clamping tool movement of step c) is effected by rotating the clamping screws (40) relative to nuts (41) which are carried on the interior of the clutch casing (5).

19. The method according to claim 16, wherein step c) comprises driving a plurality of wedges (43) between the radially inwardly extending region (24) of the clutch casing (5) and the spring tongues (11) of the diaphragm spring (6) at a plurality of peripherally distributed points, the wedges (43) being held by self-jamming and hold the diaphragm spring (6) in the venting position.

20. The method according to claim 15, wherein, for the removal of a compressed friction clutch, in which the diaphragm spring (6) rests at its external diameter on the pressing plate (4) and at its smaller sweep circle diameter (19) on the clutch casing (5), threaded pegs (44) are inserted into a plurality of holes distributed at the periphery of the clutch casing (5) and arranged directly radially outside the external diameter of the diaphragm spring (6), each threaded peg (44) engaging behind the diaphragm spring (6) with a bent projection (45) inside the clutch casing (5) and, outside the clutch casing (5), carrying a nut (46), wherein the clamping tool movement of step c) comprises screwing the nuts (46) onto the respective threaded pegs (44) to vent the diaphragm spring (6).

21. The method according to claim 15, wherein, for the removal of a tensioned friction clutch in which the diaphragm spring (31) rests with its external diameter on the clutch casing (5) and with a smaller diameter on the pressing plate (4) and has rounded regions (20) in the region of the radially outer ends of at least a few slots (21) provided between adjacent radially inwardly extending spring tongues (11), in which the pressing plate (4) has recesses (49) opposing these rounded regions (20) and in which the clutch casing (5) has holes axially opposing the rounded regions (20) in a region (23) extending radially inwardly over the external diameter of the diaphragm spring (31), clamping screws (42) are inserted into the bores in the clutch casing (5), extend through the rounded regions (20) of the diaphragm spring (31) and rest with their caps on the clutch casing (5), wherein the clamping tool movement of step c) comprises screwing the clamping screws (42) relative to nuts which rest on the interior of the diaphragm spring (31).

22. The method according to claim 1, wherein, for removal of a friction clutch in which the clutch casing (5) has a plurality of openings (25, 27) in a peripheral distribution radially outside the pressing plate (4) and the pressing plate (4) has recesses (26, 28) radially opposing the openings (25, 27), step c) comprises introducing a clamping lever (48) in succession through different ones of said clutch housing openings (25) into the radially opposed pressing plate recesses (26), and venting the pressing plate (4) in regions by pivoting of the clamping lever (48) and, in the peripheral direction to the side of the pivoted clamping lever (48), inserting a plurality of arresting pins (29) in succession radially from the exterior through openings (27) in the clutch casing (5) into recesses (28) in the pressing plate (4) to arrest the vented region of the pressing plate (4).

* * * * *

UNITED STATES PATENT AND TRADEMARK OFFICE
CERTIFICATE OF CORRECTION

PATENT NO. : 5,321,878
DATED : June 21, 1994
INVENTOR(S) : Schierling et al.

It is certified that error appears in the above-indentified patent and that said Letters Patent is hereby corrected as shown below:

Col. 11, line 68 "and is" should read -- , is --;

Col. 12, line 33, "by a" should read -- by --.

Signed and Sealed this

Twentieth Day of December, 1994

Attest:

BRUCE LEHMAN

Attesting Officer    Commissioner of Patents and Trademarks